(12) United States Patent
Young et al.

(10) Patent No.: US 11,393,489 B2
(45) Date of Patent: Jul. 19, 2022

(54) METHOD, APPARATUS, AND COMPUTER PROGRAM PRODUCT FOR ROAD NOISE MAPPING

(71) Applicant: HERE Global B.V., Eindhoven (NL)

(72) Inventors: Jeremy Michael Young, Chicago, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/699,907

(22) Filed: Dec. 2, 2019

(65) Prior Publication Data

US 2021/0166719 A1    Jun. 3, 2021

(51) Int. Cl.
*G10L 25/51* (2013.01)
*G06F 16/687* (2019.01)
(Continued)

(52) U.S. Cl.
CPC .............. *G10L 25/51* (2013.01); *G06F 16/61* (2019.01); *G06F 16/687* (2019.01); *G10L 19/00* (2013.01);
(Continued)

(58) Field of Classification Search
CPC .. G06Q 30/0261; G06Q 30/0267; G01S 3/80; G01S 5/18; G01S 19/03; G05D 1/0255;
(Continued)

(56) References Cited

U.S. PATENT DOCUMENTS 5,586,028 A * 12/1996 Sekine .................... B60T 8/174
                                                                            701/1
7,260,022 B2    8/2007 Schliep et al.
(Continued)

FOREIGN PATENT DOCUMENTS

| EP | 1990650 A1 | 11/2008 |
| EP | 2 320 382 A1 | 5/2011 |
| EP | 2168020 | 2/2013 |

OTHER PUBLICATIONS

Mednis, A. et al., *RoadMic: Road Surface Monitoring Using Vehicular Sensor Networks With Microphones*, Networked Digital Technologies (2010) 13 pages.
(Continued)

*Primary Examiner* — Matthew A Eason
*Assistant Examiner* — Kuassi A Ganmavo
(74) *Attorney, Agent, or Firm* — Alston & Bird LLP

(57) ABSTRACT

A method, apparatus, and computer program product are provided for encoding audio events as geo-referenced audio events for use in location establishment. Methods may include: receiving first audio data from a first sensor; identifying, within the first audio data, a first audio event, where the first audio event satisfies at least one predefined criteria; identifying a location corresponding to the first audio event; encoding the first audio event in a database to correspond to the location; receiving second audio data from a second sensor; identifying, within the second audio data, a second audio event; correlating the second audio event with the first audio event; and providing the location in response to the second audio data. The at least one criteria may include a statistically significant change in amplitude in the audio data.

18 Claims, 9 Drawing Sheets

(51) Int. Cl.
*G06F 16/61* (2019.01)
*G10L 19/00* (2013.01)
*H04R 1/08* (2006.01)
*G01S 5/18* (2006.01)

(52) U.S. Cl.
CPC .................. *H04R 1/08* (2013.01); *G01S 5/18* (2013.01); *G01S 2205/002* (2013.01); *H04R 2499/13* (2013.01)

(58) Field of Classification Search
CPC ....... G10L 25/51; G10L 19/00; G06F 16/187; G06F 16/61; G06F 17/3024; H04R 1/08; H04R 2499/13; G01C 21/3691; G10K 11/17823
See application file for complete search history.

(56) References Cited

U.S. PATENT DOCUMENTS

| | | | |
|---|---|---|---|
| 8,798,905 | B2 | 8/2014 | Yoshioka et al. |
| 9,234,960 | B1 | 1/2016 | McIntosh et al. |
| 9,377,528 | B2 * | 6/2016 | Birken .................... G01S 15/89 |
| 9,469,247 | B2 | 10/2016 | Juneja et al. |
| 9,899,018 | B2 | 2/2018 | Valeri et al. |
| 9,995,587 | B2 | 6/2018 | Haberl et al. |
| 10,332,504 | B1 | 7/2019 | Bastyr et al. |
| 10,347,236 | B1 | 7/2019 | Bastyr et al. |
| 2005/0212666 | A1 | 9/2005 | Kawazoe et al. |
| 2006/0100868 | A1 | 5/2006 | Hetherington et al. |
| 2006/0159281 | A1 * | 7/2006 | Koh ........................ H04R 3/005 381/92 |
| 2010/0204987 | A1 * | 8/2010 | Miyauchi ................ G10L 15/25 704/E15.001 |
| 2011/0310091 | A2 * | 12/2011 | Yoshida .................. G06T 17/05 345/419 |
| 2012/0052872 | A1 * | 3/2012 | Do ............................ G01S 5/18 455/456.1 |
| 2012/0083286 | A1 * | 4/2012 | Kim ......................... G01S 5/18 455/456.1 |
| 2013/0124081 | A1 * | 5/2013 | Khosravy ............. G01S 5/0252 701/408 |
| 2013/0311080 | A1 * | 11/2013 | Wirola .................... H04W 4/33 701/409 |
| 2013/0337830 | A1 * | 12/2013 | Haro ...................... G06Q 50/01 455/456.1 |
| 2014/0079225 | A1 * | 3/2014 | Jarske ...................... G06F 3/167 381/56 |
| 2014/0080505 | A1 * | 3/2014 | Vannucci .............. G01S 5/0252 455/456.1 |
| 2014/0257621 | A1 | 9/2014 | Zych |
| 2014/0334264 | A1 * | 11/2014 | Thaker .................... G01S 19/45 367/118 |
| 2015/0156744 | A1 * | 6/2015 | Haro ...................... H04W 4/021 455/456.1 |
| 2015/0215410 | A1 * | 7/2015 | Mateos Sole ........... H04L 67/18 709/219 |
| 2016/0009276 | A1 * | 1/2016 | Moeller ................ B60W 50/14 701/41 |
| 2016/0078760 | A1 | 3/2016 | Crickmore et al. |
| 2017/0004684 | A1 * | 1/2017 | Slater ..................... G08B 5/224 |
| 2017/0096138 | A1 * | 4/2017 | Reiff ................. B60W 30/0956 |
| 2017/0115714 | A1 | 4/2017 | Balasubramanian et al. |
| 2017/0120904 | A1 | 5/2017 | Kentley et al. |
| 2018/0045520 | A1 * | 2/2018 | Haberl ..................... G01C 7/04 |
| 2018/0053413 | A1 | 2/2018 | Patil et al. |
| 2018/0068495 | A1 | 3/2018 | Chainer et al. |
| 2018/0144762 | A1 * | 5/2018 | Guerrieri .................. G06F 3/16 |
| 2019/0003852 | A1 * | 1/2019 | Paturle ............... G01C 21/3691 |
| 2019/0113627 | A1 | 4/2019 | Koontz et al. |
| 2019/0339712 | A1 | 11/2019 | Williams et al. |

OTHER PUBLICATIONS

Zhang, Y., *Use of Vehicle Noise for Roadway Distress Detection and Assessment*, Dissertation, Northeastern University (Aug. 2014) 123 pages.

Extended European Search Report for European Application No. 20211101.9 dated Sep. 15, 2021, 14 pages.

Extended European Search Report for European Application No. 20211015.1 dated Aug. 27, 2021, 16 pages.

Non-Final Office Action for U.S. Appl. No. 16/699,921 dated Mar. 1, 2022.

"The Automated Acquisition of Road Surface Irregularity and Position Data Using Passive Acoustic Sensor", IP.COM, (Jul. 5, 2007), 6 pages.

* cited by examiner

US 11,393,489 B2

METHOD, APPARATUS, AND COMPUTER PROGRAM PRODUCT FOR ROAD NOISE MAPPING

TECHNOLOGICAL FIELD

An example embodiment relates generally to the gathering and analysis of audio data from a vehicle traveling along a road, and more particularly, to establishing geo-referenced road features and events from audio data.

BACKGROUND

Vehicle technology is evolving at a rapid pace, with vehicle sensor arrays becoming increasingly capable of providing a vast amount of data relating to the environment and context of the vehicle. Vehicle capabilities are rapidly approaching fully autonomous control, with many sensors of the sensor arrays being adapted for use in autonomous vehicle control. Image sensors and Light Distancing and Ranging (LiDAR) are popular sensor types for identifying objects along a road segment and establishing the safe path of traversal for a vehicle driving autonomously.

Image sensors and LiDAR may further be used to more precisely locate a vehicle in an environment through image comparison with a database of established road segment features. Such vehicle locating may be beneficial in situations in which Global Positioning Systems (GPS) are unavailable or unreliable, and may provide improved accuracy with respect to GPS locating. Further, the use of object and feature detection may provide accurate orientation of a vehicle in addition to location. However, image sensors and LiDAR lose effectiveness in low-visibility environments. Locating a vehicle accurately within a dark environment without GPS becomes challenging.

BRIEF SUMMARY

Accordingly, a method, apparatus, and computer program product are provided for encoding audio events as geo-referenced audio events for use in location establishment. Embodiments may include an apparatus having at least one processor and at least one non-transitory memory including computer program code instructions, the computer program code instructions configured to, when executed, cause the apparatus to at least: receive audio data from a sensor; identify, within the audio data, an audio event, wherein the audio event satisfies at least one predefined criteria; identify a location corresponding to the audio event; and encode the audio event in a database to correspond to the location. The at least one criteria may include a statistically significant change in amplitude in the audio data. The apparatus may further be caused to extract a feature of the audio event, where the feature extracted may include a degree of amplitude change in the audio data. The apparatus may be caused to categorize the audio event as an estimated road feature based, at least in part, on the extracted feature of the audio event.

According to some embodiments, causing the apparatus to encode the audio event in the database to correspond to the location may include generating a geo-referenced audio event and store the geo-referenced audio event to a map data layer to associate the audio event with the geo-referenced location. The sensor may include an audio sensor, where causing the apparatus to identify a location corresponding to the audio event may include causing the apparatus to identify a location of a vehicle carrying the audio sensor and apply an offset to the location based on a relative location between the audio sensor and a location sensor of the vehicle. The apparatus may be caused to suppress at least a portion of the audio data from the sensor in response to the at least a portion of the audio data from the sensor failing to satisfy the predetermined criteria for an audio event.

The apparatus of some embodiments may be caused to identify an environmental condition proximate the sensor, where the at least one predefined criteria is dependent upon the identified environmental condition. The identified environmental condition may include a weather condition. The sensor may include a road noise sensor associated with a wheel, where the apparatus may be caused to: receive second audio data from an ambient noise sensor; identify a second audio event in road noise audio data from the road noise sensor that satisfies the at least one predefined criteria; and suppress the second audio event in the road noise audio data from the road noise sensor that satisfies the at least one predefined criteria in response to identifying a corresponding audio event in the second audio data from the ambient noise sensor.

Embodiments provided herein may include a computer program product having at least one non-transitory computer-readable storage medium having computer-executable program code instructions stored therein. The computer-executable program code instructions may include program code instructions to: receive audio data from a sensor; identify within the audio data, an audio event, where the audio event satisfies at least one predefined criteria; and identify a location corresponding to the audio event, where the location corresponding to the audio event is identified based on the audio event corresponding to a geo-referenced audio event, where the identified location is the location corresponding to the geo-referenced audio event. The at least one criteria may include a statistically significant change in amplitude in the audio data.

The computer program product of some embodiments may include program code instructions to extract a feature of the audio event, where the feature extracted may include a degree of amplitude change in the audio data. Embodiments may include program code instructions to categorize the audio event as an estimated road feature based, at least in part, on the extracted feature of the audio event. The sensor may include an audio sensor, where the program code instructions to identify a location corresponding to the audio event may include program code instructions to identify a location of a vehicle carrying the audio sensor and apply an offset to the location based on a relative location between the audio sensor and a location sensor of the vehicle.

Embodiments may include program code instructions to suppress at least a portion of the audio data from the sensor in response to the at least a portion of the audio data from the sensor failing to satisfy the predetermined criteria for an audio event. Embodiments may include program code instructions to identify an environmental weather condition proximate the sensor, where the at least one predefined criteria may be dependent upon the identified environmental weather condition. The sensor may be a road noise sensor associated with a wheel, where the computer program product may include program code instructions to: receive second audio data from an ambient noise sensor; identify a second audio event in road noise audio data from the road noise sensor that satisfies the at least one predefined criteria; and suppress the second audio event in the road noise audio data from the road noise sensor that satisfies the at least one predefined criteria in response to identifying a corresponding audio event in the second audio data from the ambient noise sensor.

Embodiments provided herein may include a method for: receiving first audio data from a first sensor; identifying, within the first audio data, a first audio event, where the first audio event satisfies at least one predefined criteria; identifying a location corresponding to the first audio event; encoding the first audio event in a database to correspond to the location; receiving second audio data from a second sensor; identifying, within the second audio data, a second audio event; correlating the second audio event with the first audio event; and providing the location in response to the second audio data. The at least one criteria may include a statistically significant change in amplitude in the audio data.

Embodiments provided herein may include an apparatus having: means for receiving first audio data from a first sensor; means for identifying, within the first audio data, a first audio event, where the first audio event satisfies at least one predefined criteria; means for identifying a location corresponding to the first audio event; means for encoding the first audio event in a database to correspond to the location; means for receiving second audio data from a second sensor; means for identifying, within the second audio data, a second audio event; means for correlating the second audio event with the first audio event; and means for providing the location in response to the second audio data. The at least one criteria may include a statistically significant change in amplitude in the audio data.

BRIEF DESCRIPTION OF THE DRAWINGS

Figure 1:
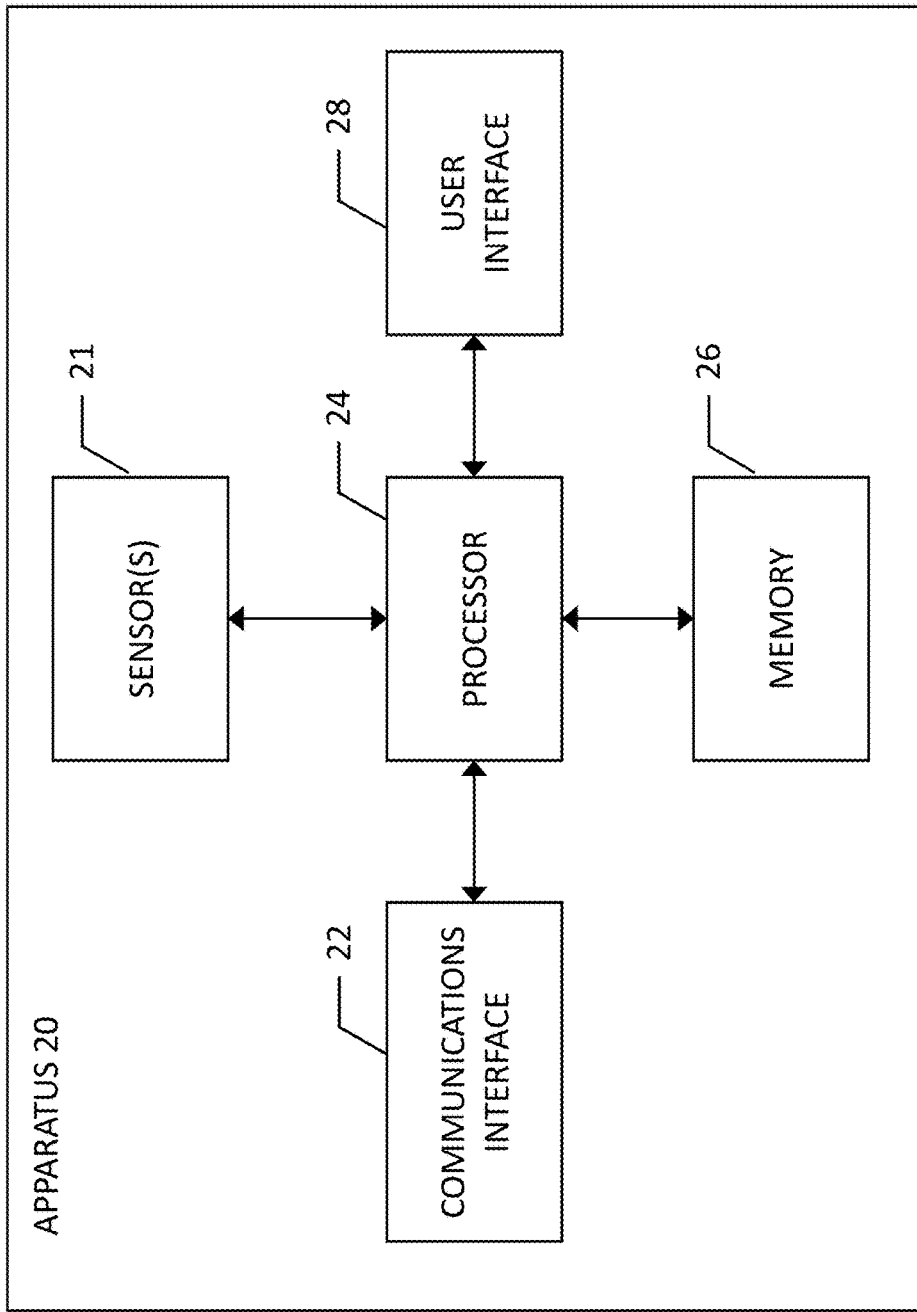
Figure 2:
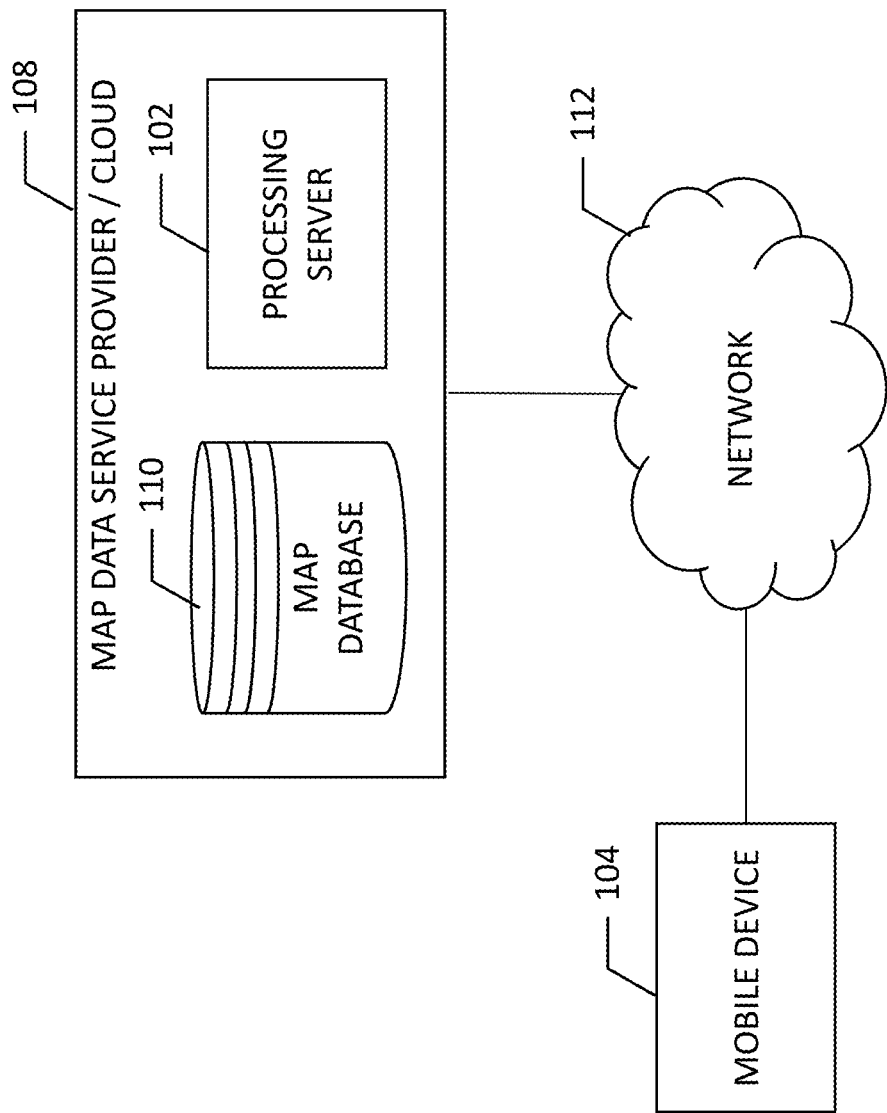
Figure 3:
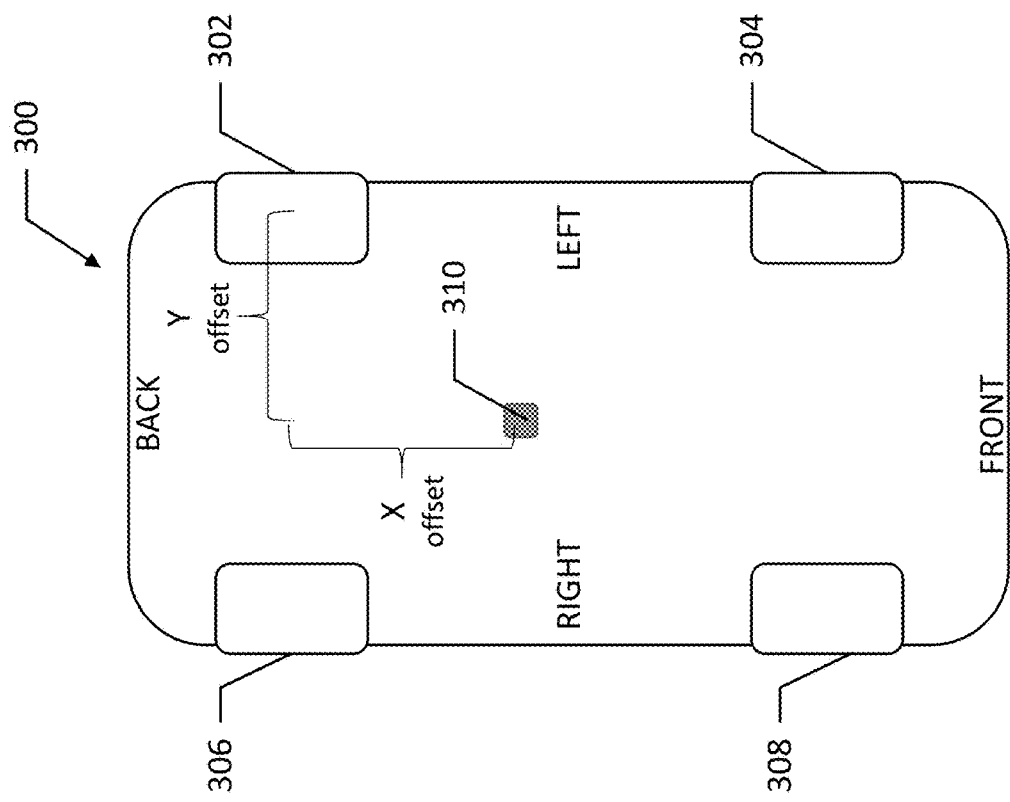
Figure 4:
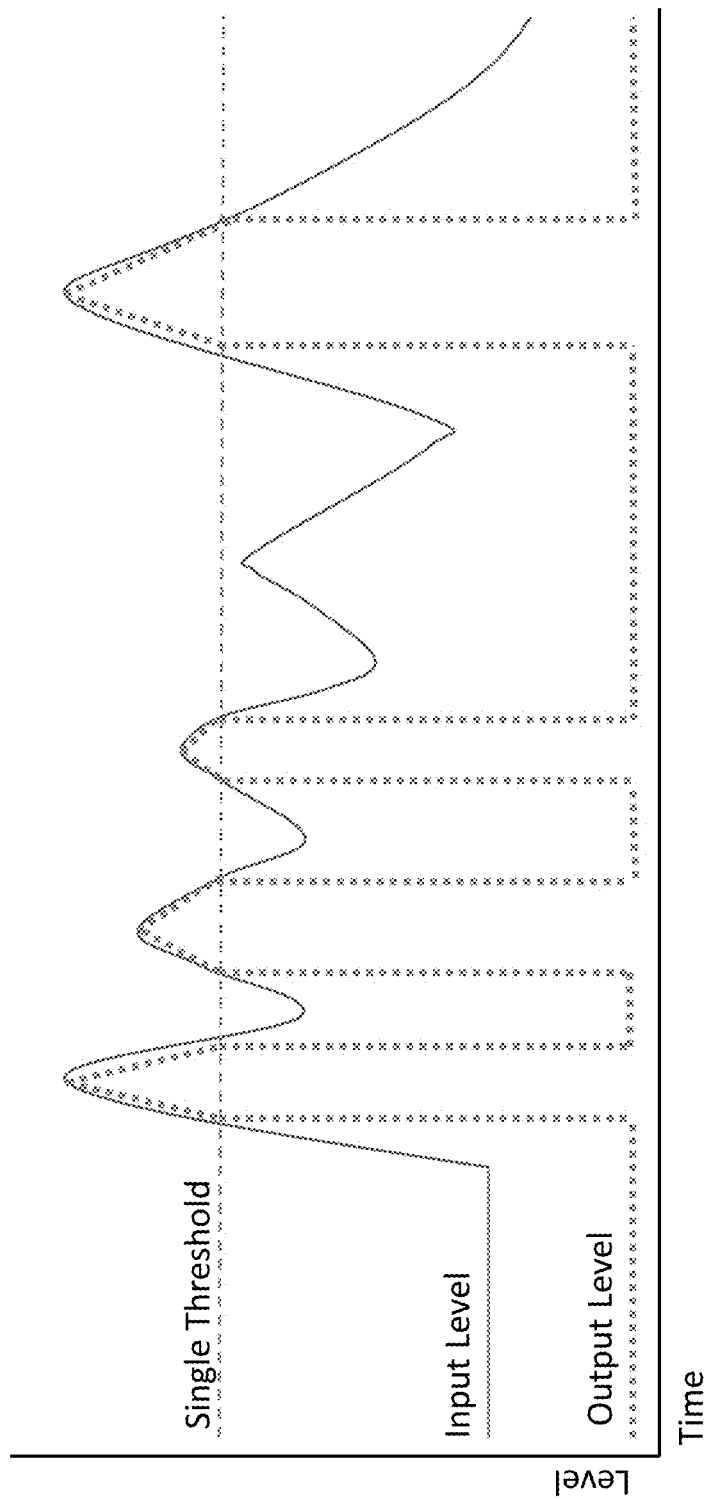
Figure 5:
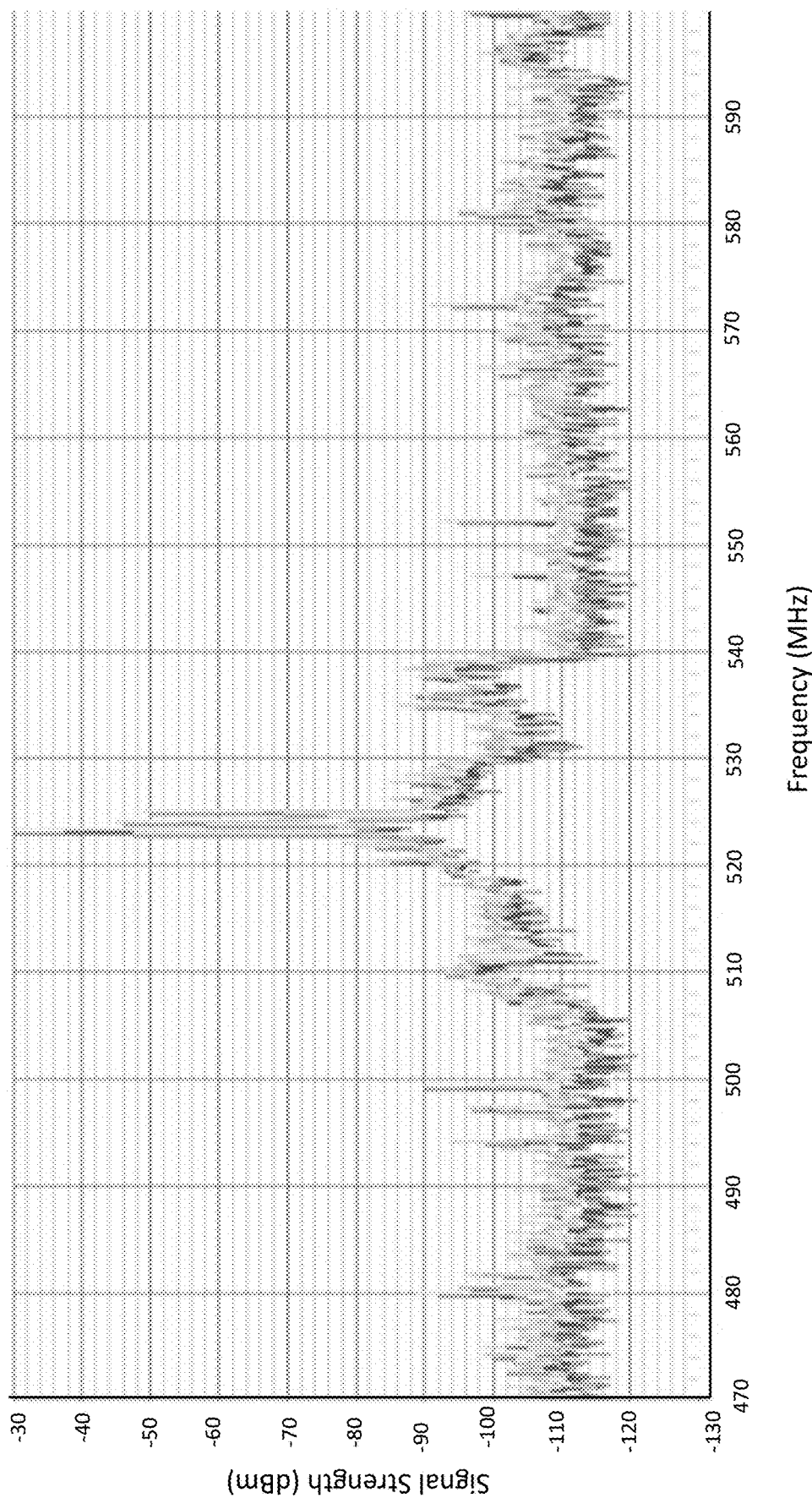
Figure 6:
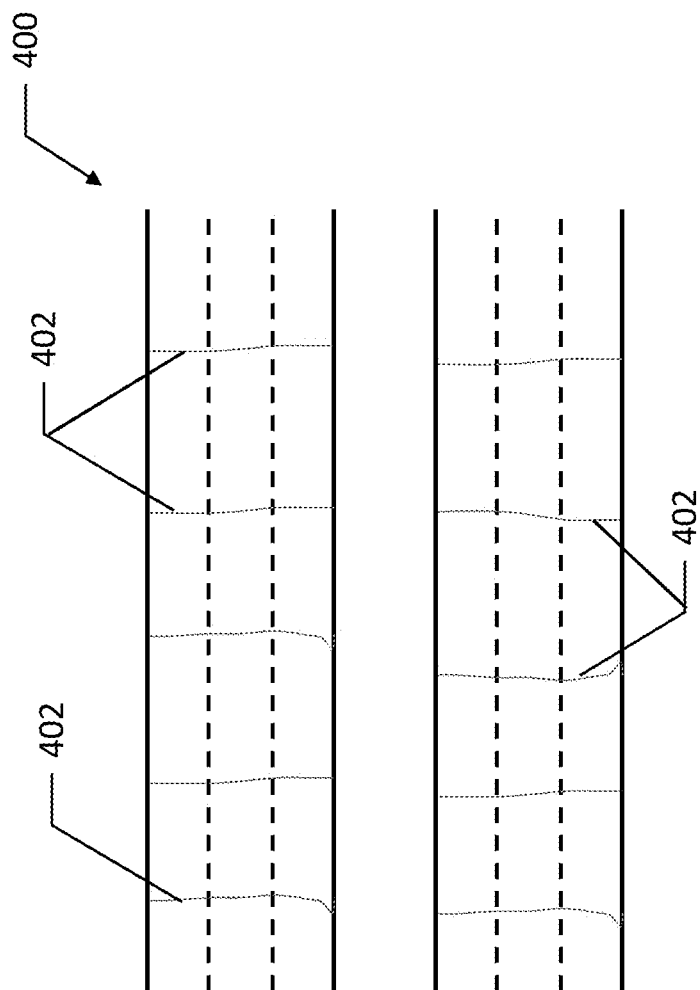
Figure 7:
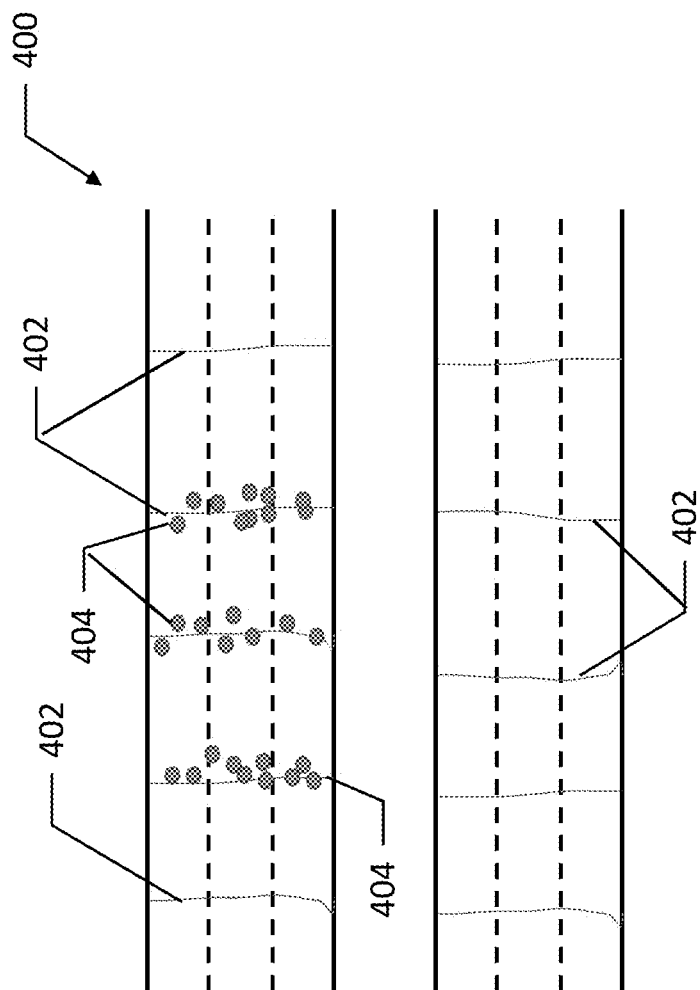
Figure 8:
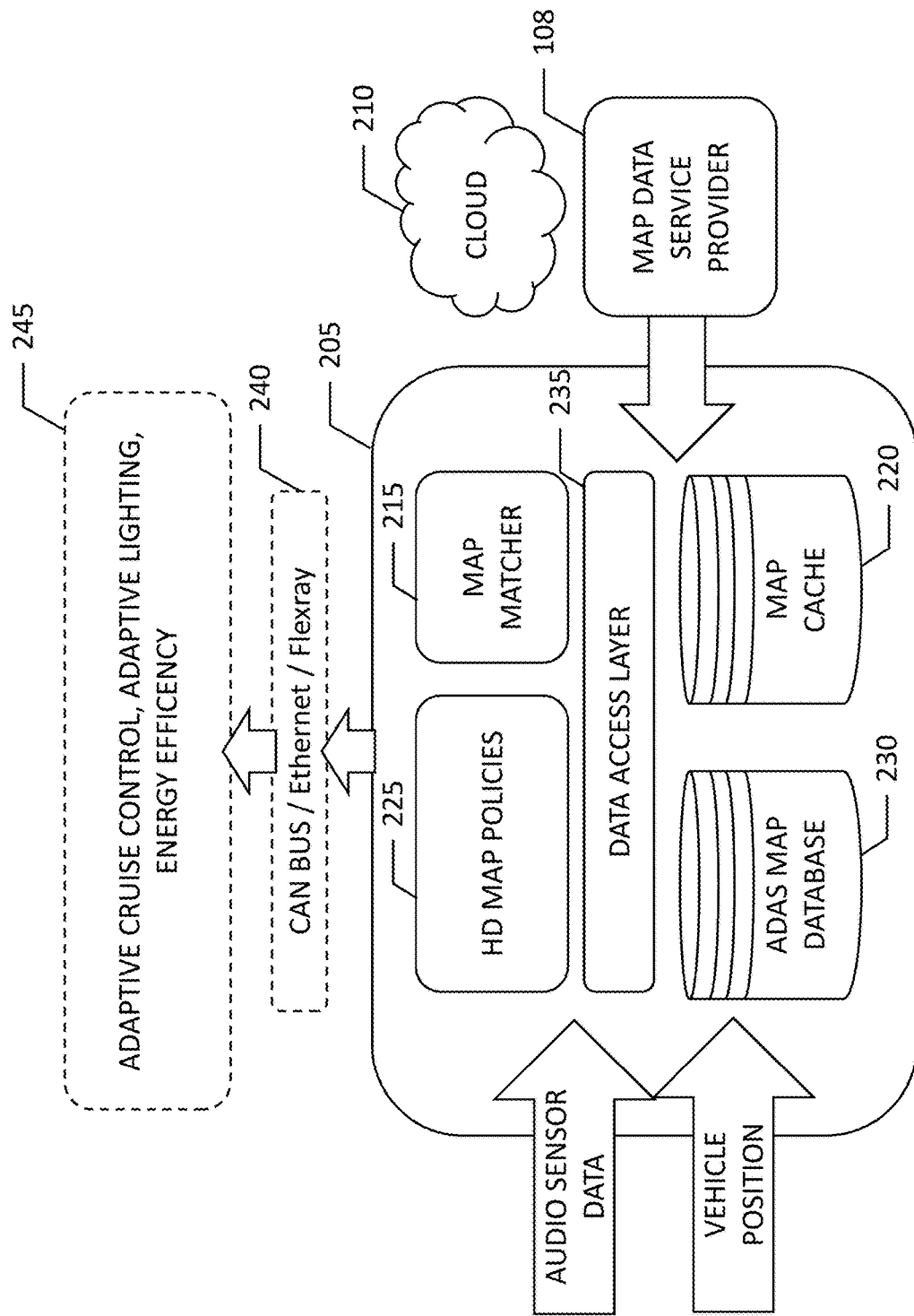
Figure 9:
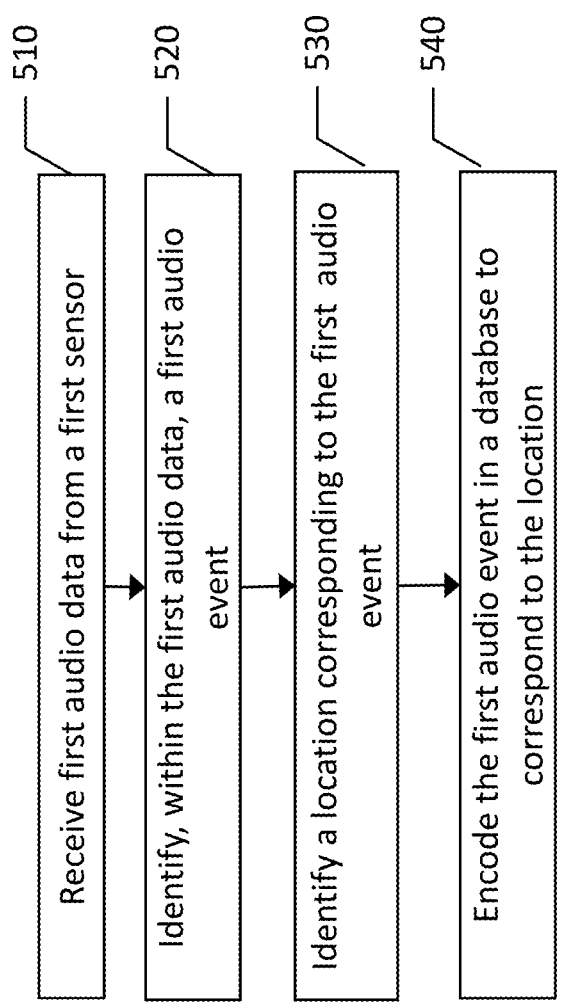

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for using geo-referenced audio events to identify the location of a vehicle according to an example embodiment of the present disclosure;

FIG. 3 illustrates a sensor arrangement on a vehicle according to an example embodiment of the present disclosure;

FIG. 4 depicts audio data captured by an audio sensor detecting road noise according to an example embodiment of the present disclosure;

FIG. 5 depicts another example of audio data captured by an audio sensor detecting road noise according to an example embodiment of the present disclosure;

FIG. 6 illustrates a road segment including cracks or seams according to an example embodiment of the present disclosure;

FIG. 7 illustrates audio events captured along the road segment of FIG. 6 according to an example embodiment of the present disclosure;

FIG. 8 illustrates an example embodiment of an architecture specifically configured for implementing embodiments described herein; and FIG. 9 is a flowchart of a method for using geo-referenced audio events to identify the location of a vehicle according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for establishing the location of a vehicle based on geo-referenced audio events. Accurate locating of a vehicle within an environment facilitates navigation, route guidance, semi-autonomous, and fully autonomous vehicle control. Autonomous vehicles leverage sensor information relating to roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control.

HD maps have a high precision at resolutions that may be down to several centimeters that identify objects proximate a road segment, and features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly. According to embodiments described herein, vehicles may further be equipped with audio sensors to collect sound data, extract the audio data, and interpret the relevant audio data in a meaningful way that facilitates location identification along a road segment.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. For example, audio sensor data received can be compared against other audio sensor data relating to the audio data captured by sensors to establish the accuracy of sensor data and to confirm the position of a vehicle along the road segment. According to some embodiments, vehicles may include multiple sensors and may seek to compare the data between the different sensors and/or sensor types to determine how closely they match. For example, geo-referenced audio data may be correlated with geo-referenced image data and/or global positioning system data to provide redundancy and evaluate accuracy of various sensors when redundant data is available.

Embodiments described herein may broadly relate to the collection of audio from sensors of a vehicle and to extract relevant audio event features for mapping localization. Embodiments focus on the audio/sound events generated by road noise which is the noise generated by a vehicle's interaction with a roadway. Roads include many irregularities and unique sequences of irregularities that make each road segment unique. The irregularities may vary by lane and even position within a lane, such as a pothole, a crack, bump (e.g., road upheave), or may be consistent within an entire road segment, such as a seam that reaches across all lanes of a road, or a seam along a road separating two different road surface materials or repairs. Further, differences between road segments or lanes of road segments may include differences in surface types, such concrete, asphalt, gravel, or metal grating such as on a bridge.

Road noise extraction and storage may include the creation of road noise feature sound files from one or more microphone sensors where prominent sounds are extracted and geo-referenced to a map. The geo-referenced sound features may be stored, such as within an HD map, as a separate map layer for example.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. The apparatus 20 may further be equipped with or in communication with one or more audio sensors or microphones. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device such as the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance, such as in an example embodiment in which map data is created or updated using methods described herein. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways where road noise collected from a vehicle associated with the navigation system user interface may aid in establishing a position of the vehicle along a road segment and optionally within a lane of the road segment. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Establishing vehicle location and position along a road segment may provide information useful to navigation and autonomous or semi-autonomous vehicle control by establishing an accurate and highly specific position of the vehicle on a road segment and even within a lane of the road segment such that map features in the HD map associated with the specific position of the vehicle may be reliably used to aid in guidance and vehicle control.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may provide cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment may provide information about potential obstacles, the behavior of others on the roadway, and areas that are navigable by the vehicle. An understanding of where other cars are and what they may do is critical for a vehicle (or apparatus 20) to safely plan a route. However, redundant mechanisms are necessary to ensure safe operation of vehicles in environments to compensate for when one sensor or array of sensors is compromised. Embodiments described herein employ audio sensors to collect road noise sounds to identify a location of a vehicle along a road segment which may provide vehicle localization when one or more other mechanisms, such as GPS, vision techniques, and local signal fingerprinting may be diminished.

Accurate localization of a vehicle is imperative for autonomous vehicle control. Such localization enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, such as may be caused by construction.

Autonomous vehicle navigation relies heavily on GPS which can provide a real-time location with a 95% confidence interval of 7.8 meters according to the standards set by governing agencies. However, in complex urban environments, reflection of GPS signals in "urban canyons" can increase the error such that location may be off by as much as 30 meters or more. Given that the width of many vehicle lanes is typically four meters or less, this accuracy is insufficient to properly localize an autonomous vehicle to enable safe route planning decisions. Other sensors, such as inertial measurement units (IMUs) can increase the accuracy of localization by taking into account vehicle movement, but these sensors may drift and fail to provide sufficient accuracy to ensure maximum safety.

Autonomous vehicle navigation requires localization accuracy, and accuracy to within 10 centimeters may provide sufficient accuracy for safety and effectiveness of autonomous navigation. One way to achieve this level of accuracy, as described herein, is through the use of geo-referenced audio events corresponding to road segments. The collection of road noise audio data can be matched to a database of geo-referenced road noise audio events to establish a location and heading. Additionally, audio sensors on board a vehicle may compare recorded audio events of a road segment and lane of an environment to establish the accuracy of a map database, such as map database 110, with respect to the environment of the vehicle. This accuracy may also be used to determine a degree to which a vehicle may rely on the accuracy of the stored map data. For instance, in an environment when localization is available from multiple sensors (e.g., GPS, visual odometry, wireless fingerprinting, geo-referenced audio, etc.), the data from the different sensors may be compared with one another and against the map database, such as the HD map, to confirm accuracy and to identify flaws in the map data.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features, such as based on the road noise generated by the vehicle as it travels along the road segment as described herein. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

According to example embodiments described herein, the role of HD maps in facilitating autonomous or semi-autonomous vehicle control may include crowd-sourced building of the maps to identify and confirm features of the maps. In the context of map-making, the features from the environment may be detected by a vehicle traveling along a road segment and consolidated to form a representation of the actual real-world environment in the form of a map. Embodiments described herein include a method, apparatus, and computer program product to use road noise generated by a vehicle captured as audio data by the vehicle to establish a localized position of the vehicle and heading as the vehicle traverses a road segment of a road network.

Vehicles traveling along a road segment may be equipped with sensors, such as sensors 21 of apparatus 20 of FIG. 1, where the sensors may include audio sensors such as microphones. FIG. 3 illustrates an example embodiment of a sensor array implemented in a vehicle for collecting road noise data as audio data. As shown, a vehicle 300 may include one or more audio sensors or microphones 302, 304, 306, and 308. While embodiments may be implemented with a single microphone audio sensor, particularly if that audio sensor is capable of directional audio detection and positioned to capture audio from multiple points (e.g., from each wheel), embodiments may include microphone audio sensors at each wheel to capture sounds related to a tire of each wheel as it contacts the roadway. Microphones may be placed inside the body of a wheel directly, between the wheel rim and tire, or the wheel wells of a vehicle to shield the microphone from surrounding noise. Further, the audio sensors may be directional microphones that may focus their attention at a point where the respective tire meets the road to help further isolate the road noise from each respective tire from surrounding sounds.

The locations of the wheels may each be identified in latitude and longitude based on a location of the vehicle using a sensor, such as a GPS sensor 310 to identify the location of the vehicle. Each vehicle or type of vehicle (e.g., make and model) may also be uniquely configured to identify an offset between the GPS sensor 310 and each of the wheels. As shown in FIG. 3, the GPS sensor 310 is located near a center of the vehicle, while the back or rear left wheel is offset by an X offset and a Y offset. Thus, understanding a position of the vehicle through a position of GPS sensor 310 provides an identification of the location of the wheel 302 using the offsets.

Using audio sensors configured to detect road noise at each wheel, as illustrated in FIG. 3, audio data may be collected for use in locating the vehicle along a road segment. In order to perform such localization, geo-referenced map-matched audio data must first be collected and stored, such as in a layer of the HD map as described above. Audio data may be collected via microphones in context with vehicle location established through positional sensors, such as GPS. Once audio files are captured, key audio events are parsed/extracted into specific events such as significant changes in decibels (dB, amplitude) and/or frequency (Hertz) to demonstrate a road noise event. These key audio events can be further analyzed for classification purposes to distinguish event such as cracks in the road versus road surface changes (e.g., concrete to asphalt), as well as categorize between fixed road events versus temporary environmental or contextual audio events detected, such as sirens, debris in the road, water in the road, etc. Once extracted and categorized, temporary environmental or contextual audio features may be suppressed while fixed road audio events may be included in the map database as their own layers in the map.

Geo-referenced audio events that are to be map-matched may be temporarily map-matched and not used for locationing purposes until the geo-referenced audio events are established as accurate through reinforcement of additional geo-referenced audio events that provide the same information/data or information/data that is within a predefined degree of similarity of other geo-referenced audio events from the same location. For example, in building a database of geo-referenced audio events for a region, one data point may be statistically insignificant, while five data points all having the same or substantially similar audio event properties (e.g., frequency, amplitude, or change in frequency or amplitude) may result in a statistically significant data point where by the audio events may cooperate or be combined to establish geo-referenced audio event information for that particular location.

An example of an audio event may include the collection of an audio event that reflects a statistically significant change in amplitude of road noise from a particular tire. Table 1 below illustrates such an event. As shown, event 00001 reflects an audio event from a sensor having a statistically significant change in amplitude (24 dB) with negligible changes in frequency. Such an event may be extracted as significant relative to the ambient noise, and categorized as a pothole, for example as the amplitude change reflects a sharp increase attributable to a substantial road anomaly. This event may be encoded as shown in Table 1 to include the location (latitude and longitude) and based on the location, a map-matched road link, and based on a particular sensor of the vehicle, an offset that is based on a delta between the locating sensor (e.g., GPS sensor) and the audio sensor that captured the event. Location may be established by sensors other than a GPS sensor, such as a location-enabled audio sensor that includes positional capabilities to avoid the need for a separate locating sensor or to supplement a locating sensor, for example.

an event would suggest a change in road surface materials and could be identified as such. The event may be encoded at the location shown and map-matched to a link together with an identified offset of the sensor capturing the frequency change.

Collection of Audio Data

Road noise, as described herein, is the noise generated based on the contact between tires of a vehicle and the road surface along which the tires are traveling. This road noise may be collected from each audio sensor as audio data. The audio data may include audio events that rise to the level of significant deviations from steady-state road noise, and these audio events may be categorized and map-matched as described above. To accurately capture audio events and to properly locate them on a map, the road noise captured by each sensor should be isolated to a specific tire while minimizing surrounding noise audio events. This provides more true localization of an audio event if it can be isolated to a single tire, and that single tire's location being known relative to a location on a road segment.

Audio sensors such as microphones may be positioned to capture sounds related to an individual tire. As shown in FIG. 3 and described above, the location may be within a wheel well of a vehicle which may protect the sensor from ambient noises while also shielding each audio sensor from other wheels around the vehicle. For most vehicles, such a sensor arrangement would include four independent audio sensors. Directional microphones may be used to further focus the attention of the audio sensor toward the contact patch between the tire and the road to further isolate the road noise of a tire from the surroundings. A microphone may optionally be placed directly above a wheel as tires are generally hollow, semi-rigid surfaces that may effectively transfer the sound through the tire to a microphone above the tire. Embodiments may embed microphones directly into the wheel attached to a tire rim, such as within the tire between the tire and the rim similar to conventional tire pressure monitoring sensors. Such a configuration may include wireless transmission of audio data from each wheel. Further, microphones located within the tire and mounted to a wheel rim may be protected from the elements while being further isolated from sounds outside of the respective tire.

An example embodiment described herein may further include ambient noise sensors positioned away from the tires in order to shield the microphones and isolate them from road noise of the tires. Such ambient noise sensors may be used to capture ambient noise while being able to discern environmental, ambient sounds that can then be filtered from the audio sensors at the wheels. Audio files from each audio

TABLE 1

| Event | Change in dB | Change in Freq. | Lat./Long. Positioning | Segment Based Positioning |
|---|---|---|---|---|
| 00001 | +24 dB | Null | 41.894171, −87.655527 | Link 12334, Offset 0.5 |
| 00002 | 0 dB | 2 kHz | 48.456421, −72.683475 | Link 54321, Offset 0.2 |

Table 1 further shows a second event, labeled event 00002. While there is no statistically significant change in amplitude or decibels (dB), there is a change in frequency of the road noise from the sensor. This change may be a transition from a first prominent frequency to a second prominent frequency, where a first prominent frequency may be steady state for a predetermined time before Event 00002 and the second frequency at an increase of 2 kHz is steady state after the event for at least a predetermined time. Such sensor may be independently recorded and synchronized in time to precisely tie data collected at each wheel with location-identifying data from GPS, LiDAR, etc. Further, data associated with the time-referenced audio data may include vehicle speed and steering angle, as both vehicle speed and steering angle may impact the road noise generated by tires. For instance, rumble strips or "cats-eye" markings along a road segment will generate a higher frequency noise commensurate with a higher speed. Further, hard cornering of a vehicle, particularly at speed, may generate a high-pitched squeal from a tire that may not be indicative of any road feature. Slow vehicle speeds, below a computed statistical value or a configurable value, may be filtered out as unreliable as road noise may be inconsistent at slow speeds even by the same or similar vehicles traveling the same road segment.

The audio data gathered by the audio sensors proximate the wheels and optionally the ambient noise audio sensor may be processed with or without compression, limiting, equalization, or other audio processing of the raw audio data. Channel amplifiers may be used and calibrated such that audio collected does not exceed peak levels which can result in distortion or clipping of collected audio data. Audio files may be captured at recording frequencies sufficient to properly identify and pinpoint anomalies, such as at 44.1 kilohertz (kHz) and in 16-bit audio; however, higher sampling rates may be beneficial for raw data, such as 96 kHz and 24-bit recording. While 44.1 kHz 16-bit audio and 96 kHz 24-bit audio is described, any level of audio quality may be used not limited to standard audio quality metrics.

As noted above, it is desirable to have multiple audio files captured from each road segment, and multiple audio files for each lane of each road segment. Such redundant collection will reinforce statistically significant road anomalies identified by audio events, and will help filter out temporary audio events such as vehicle horns or sirens, loud engines, or the like as they will not be repeatably present in the same locations for multiple different drives.

To improve the accuracy of identification of road features and anomalies, detection and suppression of outlier noises is important. During audio data collection, in an effort to reduce bandwidth and storage, not all sounds recorded by the audio files may be stored, and some sounds are identified as outliers and rejected by the system. For example, sounds of police sirens at a location should be rejected as they are temporary and do not reflect road conditions. Sound outlier suppression may take place at collection or in the cloud on back-end data processing. However, as bandwidth and data storage efficiency is being continually improved, all raw data collected by audio sensors may be stored in some example embodiments.

Embodiments described herein may use only prominent road sounds or audio events for localization. Prominence may be defined according to the number of vehicles reporting the same sound or a sound within a predefined degree of similarity of other vehicles at a given location. The higher the number of vehicles reporting the audio event or a substantially similar audio event at a location may increase the prominence value of that audio event at that location.

TABLE 2

| Lat. | Long. | Sound | Vehicle Count | Prominence |
| --- | --- | --- | --- | --- |
| 42.13215 | −87.56356 | Sound 1 | 1 | 1/41 |
| 42.13215 | −87.56356 | Sound 2 | 15 | 15/41 |
| 42.13215 | −87.56356 | Sound 3 | 25 | 25/41 |

Table 2 illustrates an example embodiment of prominence based on the repeated reports of an audio event. As shown, an audio event is identified at a location specified by the longitude and latitude. The longitude and latitude are identified as the location of an audio event experienced by numerous microphones of vehicles. The longitude and latitude windows may be broadened to some degree to allow for slight variance of the reported location of the audio event. In the illustrated embodiment of Table 2, a first audio event "Sound 1" is reported by only a single vehicle, while a second audio event "Sound 2" is reported by fifteen vehicles, and a third audio event "Sound 3" is reported by twenty five vehicles. In such an embodiment, Sound 3 has the greatest prominence and is more likely to be accurate than something with a low prominence, such as Sound 1. Sound 2 has some prominence, such that Sound 2 may also be valid and may represent a different angle of impact or different degree of overlap with an object in the roadway to result in a somewhat different sound than Sound 3. The different sounds may represent different amplitude changes or different frequencies experienced. For example, Sound 2 may be an increase in twenty decibels, while Sound 3 may be an increase of thirty decibels. In order to classify audio events as two different audio events or sounds, the distinction between them may be above a predetermined amount, such as a statistically significant amount. In an example embodiment, audio events may be separated as two different audio events based on the volume of audio events resulting in a bimodal distribution, where separation of audio events becomes apparent through the distribution.

Prominence per sound or audio event may be defined as the number of vehicles reporting the specific sound or audio event divided by the total number of vehicles that reported sounds or audio events at that location. Based on predefined thresholds, the prominence of a sound is evaluated. If the prominence of a sound is lower than a threshold (e.g., 0.25) or the total vehicle count is below a predefined threshold (e.g., 3), the sound or audio event may be considered an outlier (e.g. a temporary sound) and not sent for storage in the database as a geo-referenced audio event for effective localization. Thus, for the running example of Table 2 above, Sound 1 would be suppressed from the sound-based localization system of example embodiments.

Embodiments described herein may dismiss outliers as they are unreliable for use in locating a vehicle based on audio events. Outliers may include a variety of sound sources. For example, rain is a dynamic and temporary event, and after rain has begun and wet the surface of the road, the sound change from rain may be primarily with regard to a change in the baseline road noise rather than an audio event. However, in an example in which a sudden downpour were to start or if a vehicle exits a tunnel into a rainstorm, using the above techniques to identify audio events may identify the wet surface as a road surface change in a similar manner as one would experience transitioning from asphalt to concrete. To avoid interpretation of such a temporary sound as an audio event, embodiments may use other signals to process the audio event and to classify it accordingly. For example, weather radars for an area may be used to raise a threshold for audio event capture, such as when a rainstorm is in an area. Optionally, precipitation sensors (for automatic windshield wipers) or windshield wipers themselves may provide an indication of the beginning of a rainstorm and for audio events to be treated differently during such transitions and during the rain.

Other examples where temporary events may obscure audio events may include snow and ice, where such conditions may temporarily fill road cracks or expansion gaps such that they are not detectable. Conditions such as these may be identified and validated through weather feeds, historical weather data (e.g., snow accumulation within a predetermined time period and persistent cold temperatures), or possibly through the use of onboard cameras which can verify a snow or ice condition of a surface.

Flooding and puddling on a road surface may provide anomalies in a roadway temporarily such that historical weather patterns for an area may be used to combat erroneous audio event information that reflects only a temporary condition. Image sensors may be used to help identify pooling water and/or sensors proximate the wheel may be configured to detect the presence of water in order to inform embodiments described herein of temporary conditions that may adversely affect the collection of audio events.

Changes over time in vehicle conditions may also result in changes in the perceived road noise. For example, a vehicle may have tires rotated or replaced resulting in a different baseline road noise for the tires in each location on a vehicle. The vehicle load may alter the contact patch size of the tire which may affect the road noise levels. As these events may impact baseline road noise, they should not be identified as audio events. In this manner, road noise can change on a vehicle without negatively impacting the capabilities and detection of audio events as described herein.

Other temporary audio events may occur such as the loss of traction of a vehicle tire which may be due to sudden braking, turning, or accelerating. As this is a road noise itself, it should not be captured in a map, or considered an audio event in the road for localization. These events can be validated through advanced driving assistance systems which may detect loss of traction, emergency braking events, sudden directional changes registered by steering control, or sudden acceleration events by monitoring throttle control and sensors on the wheels with direct drive control. Brake squeal may also be detected by audio sensors which may be caused by noise devices build into brake pads to alert a driver to worn brakes, or by excessive brake dust among other situations where brake noise is prominent. These events related to changes in audio due to braking can be validated through monitoring of brake control and possibly establishing a pattern within the vehicle of noises made during braking routines. As these are not artifacts in the road to be considered, the vehicle should ignore these events for mapping purposes and incorporate such sounds into a baseline audio for exclusion from audio event identification.

Ambient noises unrelated to the road noise may be present along a roadway such that exclusion of these noises from audio events may be necessary. One or more audio sensors may be present away from the tires, such as proximate a roof of a vehicle or in another location away from the tires. The audio sensor may be shielded from wind noise of a traveling vehicle and may be used to capture the sounds of the environment, and to capture sounds that echo from other sources. For example, a tire may hit a pot hole adjacent to a road divider wall. The audio sensor of the tire may capture that audio event; however, there may be a second delayed audio event echoing off of the wall. An ambient noise sensor away from the wheel may capture this noise and identify the noise as unrelated to the audio event, thus discarding the echoed noise. Much like the audio sensors of the wheels, the ambient audio sensor may be a time-synchronized and location identified separate channel that can be used to capture raw audio data for later analysis.

As there is a great deal of continuous audio data that can be captured from the audio sensors of example embodiments, isolating and extracting significant audio events is important to ensure the map layer including audio events is meaningful and useful. As noted above, there are two key events sought when extracting audio events from audio data. Changes in amplitude measured in decibels for peak audio events helps to identify percussive sound events in the road such as road seams, cracks, potholes, etc. Changes in frequency measured in Hertz can help detect changes in road surfaces such as moving from concrete to pavement, or pavement to a grated bridge surface, for example. When looking to extract changes in amplitude, a baseline road noise level must first be established against which changes in amplitude may be measured. Most percussive sound events are demonstrated by a high spike in amplitude that is relatively short in timing. A graphical representation of changes in amplitude is depicted in FIG. 4 where a single threshold line represents a noise floor below which audio events are ignored. Events spiking above this threshold are audio events of interest.

Events identified that exceed the road noise threshold or baseline should be extracted with relevant information. Such information may include a sensor identification (e.g., front-right tire), amplitude of the event captured above the threshold, location of the event (e.g., in GPS coordinates), and speed of the vehicle. For a standard vehicle having four wheels, the data by sensor may be demonstrated as shown in Table 3 below.

TABLE 3

| Sensor | Amplitude (dB) | Lat./Long. | Speed (kph) | Timestamp |
| --- | --- | --- | --- | --- |
| RF (right-front) | +24 | 41.891471, −87.655527 | 70 | 6/12/18, 14:43:27 |
| LF (left-front) | +23 | 41.894171, −87.655542 | 70 | 6/15/18, 16:03:13 |
| RR (right-rear) | +26 | 41.894182, −87.655542 | 70 | 6/13/18, 04:41:52 |
| LR (left-rear) | +26 | 41.894182, −87.655542 | 70 | 7/1/15, 11:13:43 |

As vehicles drive over different surfaces, the frequencies of the sound waves may change as well. This is something most often noticed when driving from pavement onto a bridge surface or onto a concrete surface. Other examples include driving over rumble strips or driving along a seam in a roadway. On some occasions, a change in frequency may be accompanied by a percussive event such as an uneven change in road surfaces.

Various factors contribute to frequencies of sounds exhibited by tires as they travel along a road surface. These include a weight of a vehicle, size of the tires, both in diameter and width), tread depth/wear and pattern on a tire, tire sidewall height, tire pressure (which contributes to tire contact patch size), vehicle speed, and surface type. It is impractical to capture all of these factors as they can change such that a baseline standard may be calculated to establish a reference or baseline sound. The most prominent frequency in the sound wave may be identified that is consistent in amplitude while at a certain speed. For greater granularity, the top several key frequencies may be captured to establish a more in-depth picture.

Using frequency analysis, the baseline can be established. When the profile of the analysis goes through a significant enough change to the established constant, a major change in the road surface may be identified. For example, if 550 megahertz is the prominent frequency in the frequency analysis profile and that prominent frequency changes to 725 megahertz, such a change would represent a change event. FIG. 5 illustrates such a frequency plot in which the dominant frequency is around 522 megahertz, with a secondary frequency of around 535-540 megahertz. While raw frequency data analysis could be used to estimate the type of surface or surface anomaly along which the vehicle is traveling, the frequency analysis may be used to establish a binary indication of whether a road surface change was experienced. Table 4 below illustrates such a binary indication, whereby a change in prominent frequency is used to establish whether a road surface change was experienced, and if so, in what direction did the frequency change.

TABLE 4

| Sensor | Road Surface Change Detected? | Frequency Direction | Lat./Long. | Speed (kph) | Timestamp |
|---|---|---|---|---|---|
| RF (right-front) | Yes | Up | 41.891471, −87.655527 | 70 | 6/12/18, 14:43:27 |
| LF (left-front) | Yes | Up | 41.894171, −87.655542 | 70 | 6/15/18, 16:03:13 |
| RR (right-rear) | Yes | Up | 41.894182, −87.655542 | 70 | 6/13/18, 04:41:52 |
| LR (left-rear) | Yes | Up | 41.894182, −87.655542 | 70 | 7/1/15, 11:13:43 |

Once audio events are filtered to establish the presence of actual audio events that are considered distinct, the audio events may be encoded for mapping purposes. Audio events may include events captured that relate to significant amplitude changes, or significant frequency changes. Audio events with significant amplitude changes may include noises made when crossing over road seams or traversing a pot hole, for example. Audio events having significant frequency changes may occur, for example, when a vehicle transitions between an asphalt surface and a concrete surface.

TABLE 5

| Lat. | Long. | Observation Time | Noise Floor (dB) | Prominent Amplitude | Vehicle Speed (kph) |
|---|---|---|---|---|---|
| 41.894171 | 87.655527 | 23:51:32, 09-20-2018 | 92 | +23 | 70 |
| 41.894171 | 87.655542 | 23:57.15, 09-20-2018 | 91 | +25 | 70 |
| 41.894182 | 87.655527 | 23:13:52, 09-20-2018 | 94 | +24 | 70 |
| 41.894182 | 87.655542 | 22:22:17, 09-20-2018 | 92 | +23 | 70 |

Sensor data from vehicles may be represented as shown above in Table 5. As shown, audio events may include a location using latitude and longitude, a time stamp, a noise floor, a prominent amplitude, and a vehicle speed. The audio events may also include a steady-state frequency and an event frequency. This data may be used to create a map layer representation of significant amplitude events on a road surface that a vehicle may detect. With a library of these observations, aggregation is possible to pull together a representation of average observed events which can be mapped.

FIG. 6 illustrates an example embodiment of a multi-lane roadway 400 with cracks 402 or expansion gaps extending laterally across the lanes substantially perpendicular to the travel path of the lanes. FIG. 7 illustrates reported locations of audio events 404 for several of the cracks 402. According to Table 5 and FIG. 7, point-based amplitudes are reported by vehicles at specific locations. These point-based reports maybe aggregated to form high-level shapes such as lines (seams or cracks across the road in this example), or shapes such as circles or polygons which may identify potholes or manhole covers, for example. Any density-based clustering scheme, such as DB-SCAN can be used. The DB-SCAN scheme takes two parameters as inputs: A) points with at least a minimum number of points within a B) distance of a core point. In the specific problem domain, the minimum number of points may be set to two, for example, while the distance may be set to one meter. The two parameters are configurable and the minimum number of points indicates the minimum number of audio events that are required to form a cluster, while the distance is related to the distance between the audio event points.

For clustering, the observation timestamp may also be considered. It is desirable to form clusters from more recent observations. This way, the most recent noise representation of the road may be used for localization. An observation in the last ten years may not be useful for clustering since the road may have deteriorated or improved since a prior point that was gathered a substantial amount of time earlier. The period over which observations may be used may be configurable, and may depend upon the type of observation. In some cases the most recent observations may be observations from the previous X-number of years, where X is configurable, for example. In some cases, the period may be considerably shorter such as a number of months or weeks.

After clustering the amplitude points, a higher level geometry is obtained and attributes can be extracted from each cluster. These attributes may include: statistics on the noise floor (e.g., mean and standard deviation); statistics on prominent amplitude (e.g., mean and standard deviation); statistics on vehicle speed (e.g., mean and standard deviation); geometry (e.g., line or polygon—regular or irregular); and a list of observation times.

TABLE 6

| Geometry | Std. Dev. Of noise floor | Std. Dev. Of amplitude | Std. Dev. Of vehicle speed | Mean of noise floor | Mean of amplitude | Mean of vehicle speed | Observation times |
|---|---|---|---|---|---|---|---|
| LINESTRING (0 0, 1 1, 2 1, 2 2) | $SD1^{nf}$ | $SD1^{a}$ | $SD1^{vs}$ | $M1^{nf}$ | $M1^{a}$ | $M1^{vs}$ | List of Obs. Times UTC |

TABLE 6-continued

| Geometry | Std. Dev. Of noise floor | Std. Dev. Of amplitude | Std. Dev. Of vehicle speed | Mean of noise floor | Mean of amplitude | Mean of vehicle speed | Observation times |
|---|---|---|---|---|---|---|---|
| POLYGON (0 0, 1 0, 1 1, 0 1, 0 0) | $SD2^{nf}$ | $SD2^{a}$ | $SD2^{vs}$ | $M2^{nf}$ | $M2^{a}$ | $M2^{vs}$ | List of Obs. Times UTC |

Table 6 illustrates information that may be published to the map layer for amplitude measurements in audio events. These audio events are much like any three-dimensional representation of an object on a road (such as signs, barriers, etc.), the difference is that they are at the road surface. However, they may have characteristics, such as length, width, angle, etc.

Over time, features of a road such as a crack or seam or anything that creates a percussive sound event when traversed by a vehicle that exceeds a standard threshold, may change. As these anomalies in the road surface increase in size due to repeated wear, they will generally increase in amplitude of the road noise as more vehicles ride over them. Further, road improvements will occur over time to address poor road conditions such that the fingerprint of road noise may take on a new sound profile with road improvements. For this reason, it is important that a regular stream of recent sensor data may be used to account for changes in the real world.

Embodiments provided herein capture this data by wheel/tire road noise as cracks in the road may not be perpendicular to road surfaces, where each set of tires may not observe an audio event simultaneously. It is these differences that truly help build a more detailed road noise fingerprint. Another example of a feature of a road may include reflectors embedded at a boundary of the lane. When the reflectors of a road are encountered by a vehicle tire, a percussive noise may be generated first on one side of the tires, then on the other (e.g., first a front tire, then a back tire). An example of this can help identify or confirm a lane change with these additional audio cues as well as both longitudinal and latitudinal location on a road based on when/where the audio event(s) happen.

The above-described audio events relate to amplitude changes and percussive noise generated by road features. However, road features may provide audio events that relate to frequency changes rather than or in addition to amplitude changes. As vehicles drive over different surfaces, the frequencies of the sound waves may change as well. Such a change is prominent when driving from pavement onto a bridge surface or onto a concrete surface. A vehicle may collect observations as illustrated in Table 7 below.

TABLE 7

| Lat. | Long. | Observation Time | Observed Prominent Frequency (Hz) | Vehicle Speed (kph) |
|---|---|---|---|---|
| 41.894171 | 87.655527 | 23:51:32, 09-20-2018 | 470 | 70 |
| 41.894171 | 87.655542 | 23:57.15, 09-20-2018 | 460 | 70 |
| 41.894182 | 87.655527 | 23:13:52, 09-20-2018 | 463 | 70 |
| 41.894182 | 87.655542 | 22:22:17, 09-20-2018 | 471 | 70 |

With data collected from the vehicles and stored in a map layer, this information may be represented in the map layer as an object with a geometry and location of the audio events much like other localization features such as points of interest, guard rails, signs, etc. Much like a significant amplitude change audio event, a series of point based road noise frequency observations may be aggregated using clustering and then statistical extraction on each cluster to make a map layer representation of these events for vehicle consumption. Each cluster may be represented as a line or polygon, as described above with respect to amplitude based audio events.

Aggregated audio events are used to update a map layer in an HD map to enable vehicles to use sound matching or matching of audio events to audio events in the map layer to provide a locating mechanism that may be used in place of or in addition to visual locating means and satellite-based locating means. In this manner, a vehicle can supplement localization techniques with sound-based localization to recognize where the vehicle is in a region.

Localization using audio events as described herein may provide accurate localization of a vehicle within a small tolerance. For example, understanding the speed of a vehicle traveling along the road segment of FIGS. 6 and 7, identification of the audio events corresponding to cracks in the roadway may enable localization to within a matter of inches along the length of the roadway. While some road anomalies like cracks or seams may extend across the width of a roadway and may provide a reliable indication of a position along a road segment, other road features and anomalies may provide localization of a vehicle along a width of a roadway. For example, potholes are generally not continuous across the width of a roadway or even a lane, such that an audio event captured by a vehicle and identified as a pothole in the audio event map layer may provide a precise location of a vehicle on a road as the vehicle reports which wheel encountered the audio event, and the location of the pothole is known. Thus, the orientation of the vehicle with respect to the pothole provides a very finite localization of the vehicle's position.

FIG. 8 illustrates an example embodiment of an architecture specifically configured for implementing embodiments described herein. The illustrated embodiment of FIG. 8 may be vehicle-based, where sensor data is obtained from sensors of a vehicle traveling along a road segment. The location of the collected sensor data along the road segment may be determined through location determination using GPS or other localization techniques and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. As described above, these sensors may include audio sensors used to collect road noise data from each wheel and tire of a vehicle to identify road anomalies and surface transitions through amplitude and frequency analysis. A vehicle with autonomous or semi-autonomous control may establish accurate location through the use of audio events to facilitate the autonomous or semi-autonomous control.

FIG. 9 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 9 is a flowchart of a method for using geo-referenced audio events to establish a location of a vehicle. As shown, first audio data is received from a first sensor at 510. The sensor (e.g., sensor 21) may be a microphone positioned as shown in FIG. 3 to capture road noise from a tire of a vehicle. Within the first audio data, a first audio event may be identified at 520. Identification of the first audio event may be performed, for example, by processor 24. A location corresponding to the first audio event is identified at 530, and may be established through a locating means, such as using a Global Positioning System (GPS), wireless fingerprinting, signal triangulation, or the like. The first audio event is encoded at 540 to correspond to the location.

In an example embodiment, an apparatus for performing the method of FIG. 5 above may comprise a processor (e.g., the processor 24) configured to perform some or each of the operations (510-580) described above. The processor may, for example, be configured to perform the operations (510-580) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-580 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least: receive first audio data from a first sensor; identify, within the first audio data, a first audio event, wherein the first audio event satisfies at least one predefined criteria; identify a first geographic location corresponding to the first audio event by causing the apparatus to identify a vehicle location of a vehicle carrying the first sensor and apply an offset to the vehicle location based on a relative location between the first sensor and a location sensor of the vehicle; encode the first audio event in a database to correspond to the first geographic location; receive second audio data from a second sensor; identify, within the second audio data, a second audio event; and determine a geographic location of the second sensor to be the first geographic location in response to the second audio event corresponding to the first audio event.

2. The apparatus of claim 1, wherein the at least one criteria comprises a change in amplitude in the first audio data of a predefined proportion relative to ambient audio amplitude from the first sensor.

3. The apparatus of claim 1, wherein the apparatus is further caused to extract a feature of the first audio event wherein the feature extracted comprises a degree of amplitude change in the first audio data.

4. The apparatus of claim 3, wherein the apparatus is further caused to categorize the first audio event as an estimated road feature based, at least in part, on the extracted feature of the first audio event.

5. The apparatus of claim 1, wherein causing the apparatus to encode the first audio event in the database to correspond to the first geographic location comprises generating a geo-referenced first audio event and store the geo-referenced first audio event to a map data layer to associate the first audio event with the geo-referenced location.

6. The apparatus of claim 1, wherein the apparatus is further caused to suppress at least a portion of the first audio data from the first sensor in response to the at least a portion of the first audio data from the first sensor failing to satisfy the predetermined criteria for an audio event.

7. The apparatus of claim 1, wherein the apparatus is further caused to identify an environmental condition proximate the first sensor, wherein the at least one predefined criteria is dependent upon the identified environmental condition.

8. The apparatus of claim 7, wherein the identified environmental condition comprises a weather condition.

9. The apparatus of claim 1, wherein the first sensor is a road noise sensor associated with a wheel, wherein the apparatus is further caused to: receive third audio data from an ambient noise sensor; identify a third audio event in road noise audio data from the road noise sensor that satisfies the at least one predefined criteria; and suppress the third audio event in the road noise audio data from the road noise sensor that satisfies the at least one predefined criteria in response to identifying a corresponding audio event in the third audio data from the ambient noise sensor.

10. A computer program product comprising at least one non-transitory computer-readable storage medium having computer-executable program code instructions stored therein, the computer-executable program code instructions comprising program code instructions to: receive audio data from an audio sensor; identify, within the audio data, an audio event, wherein the audio event satisfies at least one predefined criteria; identify a location corresponding to the audio event, wherein the location corresponding to the audio event is identified based on the audio event corresponding to a geo-referenced audio event, wherein the identified location is the location corresponding to the geo-referenced audio event; and identify a location of a vehicle carrying the audio sensor based on an offset of a relative location between the audio sensor and a location sensor of the vehicle.

11. The computer program product of claim 10, wherein the at least one criteria comprises a change in amplitude in the audio data of a predefined proportion relative to ambient audio amplitude from the first sensor.

12. The computer program product of claim 10, further comprising program code instructions to extract a feature of the audio event wherein the feature extracted comprises a degree of amplitude change in the audio data.

13. The computer program product of claim 12, further comprising program code instructions to categorize the audio event as an estimated road feature based, at least in part, on the extracted feature of the audio event.

14. The computer program product of claim 10, further comprising program code instructions to suppress at least a portion of the audio data from the sensor in response to the at least a portion of the audio data from the sensor failing to satisfy the predetermined criteria for an audio event.

15. The computer program product of claim 10, further comprising program code instructions to identify an environmental weather condition proximate the sensor, wherein the at least one predefined criteria is dependent upon the identified environmental weather condition.

16. The computer program product of claim 10, wherein the sensor is a road noise sensor associated with a wheel, the computer program product further comprising program code instructions to: receive second audio data from an ambient noise sensor; identify a second audio event in road noise audio data from the road noise sensor that satisfies the at least one predefined criteria; and suppress the second audio event in the road noise audio data from the road noise sensor that satisfies the at least one predefined criteria in response to identifying a corresponding audio event in the second audio data from the ambient noise sensor.

17. A method comprising:
receiving first audio data from a first sensor; identifying, within the first audio data, a first audio event, wherein the first audio event satisfies at least one predefined criteria; identifying a location corresponding to the first audio event by identifying a vehicle location of a vehicle carrying the first sensor and applying an offset to the vehicle location based on a relative location between the audio sensor and a location sensor of the vehicle; encoding the first audio event in a database to correspond to the location; receiving second audio data from a second sensor; identifying, within the second audio data, a second audio event; correlating the second audio event with the first audio event; establishing a position of the second audio event at the location in response to the second audio event correlating with the first audio event; and providing the location in response to the second audio data.

18. The method of claim 17, wherein the at least one criteria comprises a change in amplitude in the first audio data of a predefined proportion relative to ambient audio amplitude from the first sensor.

* * * * *